United States Patent [19]

Reimann

[11] Patent Number: 4,484,456
[45] Date of Patent: Nov. 27, 1984

[54] TRIPLE LOOP HEAT EXCHANGER FOR AN ABSORPTION REFRIGERATION SYSTEM

[75] Inventor: Robert C. Reimann, Lafayette, N.Y.

[73] Assignee: The United States of America as represented by the United States Department of Energy, Washington, D.C.

[21] Appl. No.: 544,173

[22] Filed: Oct. 21, 1983

[51] Int. Cl.³ .......................................... F25B 15/00
[52] U.S. Cl. .......................................... 62/476; 62/489
[58] Field of Search ................................ 62/489, 476

[56] References Cited

U.S. PATENT DOCUMENTS

| 3,640,084 | 2/1972 | Hopkins et al. | 62/476 X |
| 3,651,655 | 3/1972 | Dyre | 62/476 X |
| 4,348,868 | 9/1982 | Foster et al. | 62/101 |
| 4,364,240 | 12/1982 | Schulz et al. | 62/489 X |

Primary Examiner—Lloyd L. King
Attorney, Agent, or Firm—David L. Adour

[57] ABSTRACT

A triple loop heat exchanger for an absorption refrigeration system is disclosed. The triple loop heat exchanger comprises portions of a strong solution line for conducting relatively hot, strong solution from a generator to a solution heat exchanger of the absorption refrigeration system, conduit means for conducting relatively cool, weak solution from the solution heat exchanger to the generator, and a bypass system for conducting strong solution from the generator around the strong solution line and around the solution heat exchanger to an absorber of the refrigeration system when strong solution builds up in the generator to an undesirable level. The strong solution line and the conduit means are in heat exchange relationship with each other in the triple loop heat exchanger so that, during normal operation of the refrigeration system, heat is exchanged between the relatively hot, strong solution flowing through the strong solution line and the relatively cool, weak solution flowing through the conduit means. Also, the strong solution line and the bypass system are in heat exchange relationship in the triple loop heat exchanger so that if the normal flow path of relatively hot, strong solution flowing from the generator to an absorber is blocked, then this relatively, hot strong solution which will then be flowing through the bypass system in the triple loop heat exchanger, is brought into heat exchange relationship with any strong solution which may have solidified in the strong solution line in the triple loop heat exchanger to thereby aid in desolidifying any such solidified strong solution.

3 Claims, 1 Drawing Figure

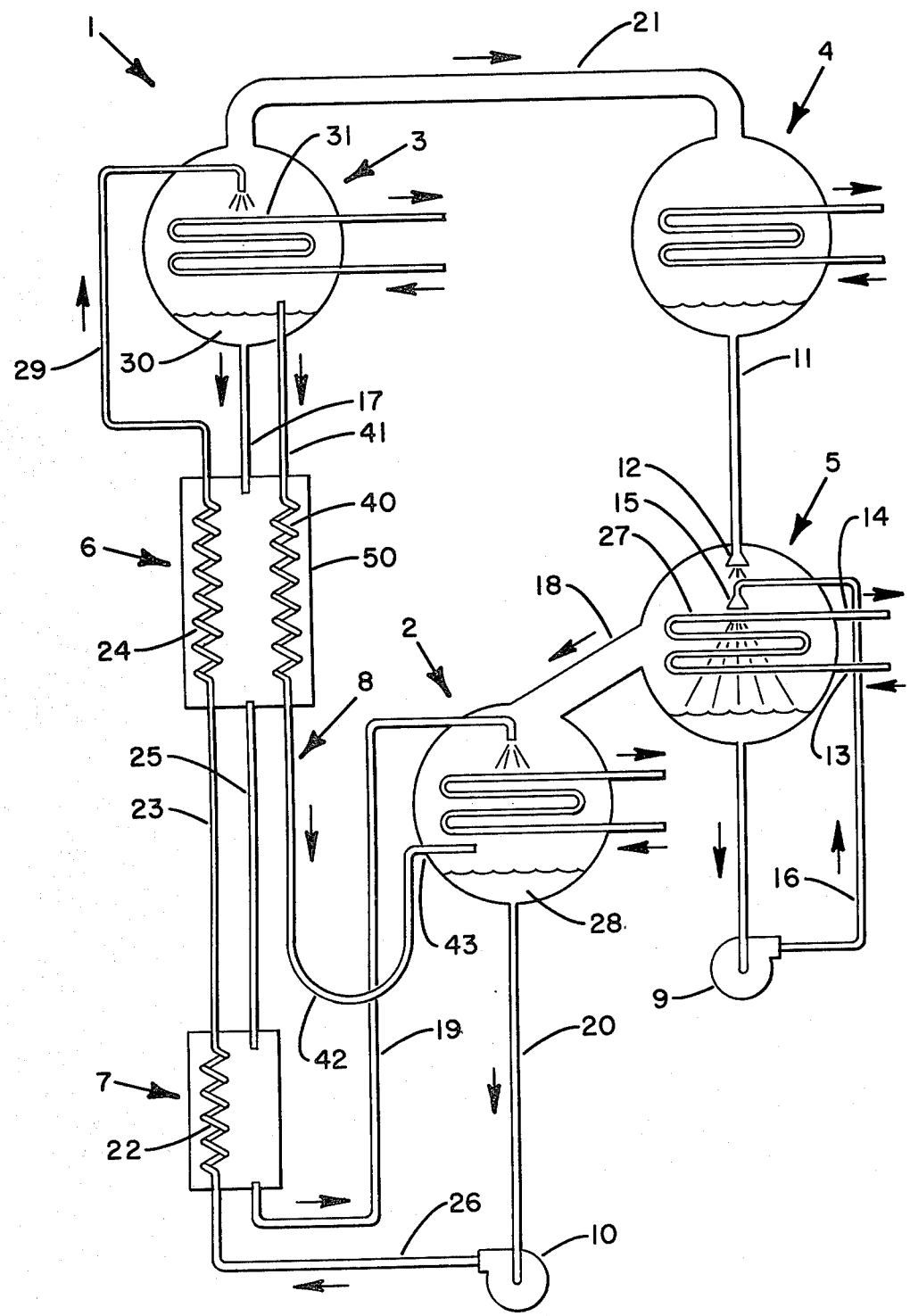

TRIPLE LOOP HEAT EXCHANGER FOR AN ABSORPTION REFRIGERATION SYSTEM

STATEMENT AS TO RIGHTS TO INVENTIONS MADE UNDER FEDERALLY SPONSORED RESEARCH AND DEVELOPMENT

The U.S. government has rights in this invention pursuant to contract number DE-AC03-77CS31587 awarded by the U.S. Department of Energy.

BACKGROUND OF THE INVENTION

The present invention relates to absorption refrigeration systems and more particularly relates to heat exchangers for absorption refrigeration systems.

In an absorption refrigeration system, relatively cool, weak absorbent solution is usually pumped from an absorber to a generator where heat is provided to boil off refrigerant from the weak absorbent solution to form relatively strong absorbent solution. The relatively hot, strong absorbent solution formed in the generator is returned to the absorber where it is cooled and brought into contact with refrigerant vapor to form the relatively weak absorbent solution which is pumped back to the generator to begin the cycle again.

Conventionally, to improve the efficiency of an absorption refrigeration system, a solution heat exchanger is provided for transferring heat between the relatively hot, strong absorbent solution flowing from the generator to the absorber and the relatively cool, weak absorbent solution pumped from the absorber to the generator. The solution heat exchanger serves to preheat the solution which is to be heated in the generator and serves to precool the solution which is to be cooled in the absorber.

Normally, the generator is located above the absorber and is connected through conduits to the absorber so that the relatively hot, strong absorbent solution flows solely by the force of gravity from the generator through the conduits to the absorber. Typically, in this arrangement, the solution heat exchanger is located below the absorber, which is below the generator, so that during normal operation of the absorption refrigeration system the solution heat exchanger remains full of strong absorbent solution. This leaves a substantial length of conduit, namely, the strong solution line for conducting strong absorbent solution from the generator to the solution heat exchanger, exposed to ambient conditions. If the ambient conditions are expected to be unfavorable, this strong solution line may be insulated to protect the strong absorbent solution flowing through this line from undesirable effects which may occur, such as solidification of strong absorbent solution in this line, due to these unfavorable ambient conditions. However, under certain circumstances, solidification may occur in the strong solution line even if this line is insulated.

In addition, occasionally, difficulty from sources other than ambient conditions is experienced in an absorption refrigeration system of the type described above, due to cooling of the strong absorbent solution in the solution heat exchanger, and/or in the strong solution line for conducting strong absorbent solution from the generator to the solution heat exchanger, below the solidification point of the solution. This may occur, for example, if too much heat is supplied to the generator or if cooling water supplied to the absorber is unexpectedly cold.

When solidification of strong absorbent solution occurs in the solution heat exchanger and/or in the strong solution line for conducting strong absorbent solution from the generator to the solution heat exchanger, strong solution is prevented from flowing from the generator to the absorber. This may result in weak absorbent solution being over cooled in the absorber which, in turn, results in further solidification of strong solution in the solution heat exchanger as over cooled, weak solution is passed through it to the generator. Eventually, the level of solution in the absorber may be lowered to a level such that the solution pump, which forwards weak solution to the generator from the absorber, may run dry thereby damaging the pump. In addition, the strong solution in the generator may rise to a level at which the solution enters the condenser and flows into the evaporator thereby impairing operation of the absorption refrigeration system for a period of time even after the solution heat exchanger is desolidified.

To prevent solidification of strong solution in the solution heat exchanger and/or in the strong solution line for conducting strong absorbent solution from the generator to the solution heat exchanger, from rendering the absorption refrigeration system totally inoperative, a bypass system may be provided for passing excess solution from the generator around the strong solution line and the solution heat exchanger to the absorber. This permits the refrigeration system to operate, at least at partial capacity and efficiency, when the solution heat exchanger and/or the strong solution line are blocked. Also, use of such a bypass system prevents excess solution in the generator from entering the condenser and prevents running the solution pump dry.

At the same time, the bypass system inhibits further solidification in the solution heat exchanger and tends to aid in desolidification because the weak absorbent solution from the absorber, which passes through the unblocked side of the solution heat exchanger, is heated by the generator and then is returned directly to the absorber by the bypass system. This warms the weak absorbent solution in the absorber which, in turn, warms the blockage in the solution heat exchanger when the now warm weak absorbent solution flows back through the solution heat exchanger to the generator.

However, a bypass system as described above, does not aid in desolidification of strong absorbent solution in the strong solution line for conducting strong absorbent solution from the generator to the solution heat exchanger. Thus, such a bypass system may not effectively remedy a blockage due to solidification of strong absorbent solution in this strong solution line. In addition, exposure of this strong line, even if insulated, to ambient conditions is not particularly suitable from the standpoint of maximizing operating efficiency of the absorption refrigeration system.

SUMMARY OF THE INVENTION

Therefore, an object of the present invention is to improve the operating efficiency of an absorption refrigeration system.

Another object of the present invention is to improve the effectiveness and the operation of a bypass system in an absorption refrigeration system.

These and other objects of the present invention are attained by an absorption refrigeration system having a triple loop heat exchanger, in addition to a conventional solution heat exchanger, for thermally coupling a bypass system, a strong solution line for conducting strong absorbent solution from a generator to a solution heat exchanger, and a weak solution line for conducting weak absorbent solution from the solution heat exchanger to the generator. The triple loop heat exchanger thermally couples the bypass system to the strong solution line which, in turn, is thermally coupled to the weak solution line.

During normal operation of the absorption refrigeration system, no solution flows through the bypass system and, thus, no heat exchange occurs between the bypass system and the strong absorbent solution flowing through the strong solution line in the triple loop heat exchanger. However, during this normal operation, heat exchange does occur between the strong absorbent solution flowing through the strong solution line and the weak absorbent solution flowing through the weak solution line in the triple loop heat exchanger. This effectively extends the area of heat exchange between relatively cool, weak absorbent solution pumped from the absorber to the generator and relatively hot, strong absorbent solution flowing from the generator to the absorber thereby increasing the operating efficiency of the absorption refrigeration system.

If solidification does occur in the solution heat exchanger and/or the strong solution line for conducting strong absorbent solution from the generator to the solution heat exchanger, relatively hot, strong absorbent solution flows through the bypass system and heat is transferred in the triple loop heat exchanger from this relatively hot, strong absorbent solution to any solidified solution in the strong solution line in the triple loop heat exchanger thereby aiding in desolidifying any such solidified strong solution. Also, if there is such a blockage due to solidification, warmed, weak absorbent solution which flows from the absorber through the solution heat exchanger and then through the weak solution line in the triple loop heat exchanger back to the generator also aids in desolidifying strong absorbent solution which may have solidified either in the solution heat exchanger or in the strong solution line in the triple loop heat exchanger.

BRIEF DESCRIPTION OF THE DRAWING

Other features and advantages of the present invention will be apparent from the following detailed description in conjunction with the accompanying drawing, in which:

The FIGURE is a schematic diagram of an absorption refrigeration system having a triple loop heat exchanger according to the present invention.

DESCRIPTION OF THE PREFERRED EMBODIMENT

Referring to the FIGURE, a schematic diagram is shown of an absorption refrigeration system 1 according to the present invention, which employs water as a refrigerant and lithium bromide as an absorbent solution. Technically, pure lithium bromide is an absorbent and is not an absorbent solution. However, it is customary to refer to the absorbent in an absorption refrigeration system as being a solution because the absorbent may have refrigerant dissolved therein. Therefore, the term "solution" is used throughout this patent application to denote both pure absorbent and absorbent solution. Also, it should be noted that the term "strong solution" is used herein to denote an absorbent solution which has a high concentration of absorbent, such as pure lithium bromide, while the term "weak solution" is used herein to denote an absorbent solution which has a low concentration of absorbent because it has a substantial quantity of refrigerant dissolved therein. Further, it should be noted that refrigerants other than water and absorbents, other than lithium bromide, may be used within the scope of this invention, and various modifications may be made to the refrigeration system 1 to accomodate these different refrigerants and absorbents.

The absorption refrigeration system 1, as schematically shown in the FIGURE, includes an absorber 2, a generator 3, a condenser 4, an evaporator 5, a triple loop heat exchanger 6, and a solution heat exchanger 7. Also, there is a refrigerant pump 9 and a solution pump 10.

Generator 3 includes a suitable source of heat for boiling refrigerant out of weak solution supplied from the triple loop heat exchanger 6 through generator inlet line 29 to the generator 3. For example, as shown in FIG. 1, the heat source may be a hot fluid, such as hot water, supplied through tubing 31 in the generator 3. The refrigerant vapor formed in the generator 3 passes through a discharge passageway 21 into the condenser 4 where it is cooled and condensed. The relatively hot, strong solution collected in a sump 30 of the generator 3 passes through a strong solution discharge line 17 to the triple loop heat exchanger 6 wherein the strong solution is precooled by relatively cool weak solution flowing through a heat exchange coil 24 in the triple loop heat exchanger 6. The precooled strong solution from the triple loop heat exchanger 6 flows through a discharge line 25 to the solution heat exchanger 7 and then through a strong solution inlet passage 19 to the absorber 2.

Liquid refrigerant condensed in the condenser 4 passes through a refrigerant liquid passage 11 to a refrigerant spray nozzle 12, or plurality of such nozzles, in the evaporator 5. Also, liquid refrigerant which collects in a sump of the evaporator 5 is pumped by the refrigerant pump 9 through a passageway 16 to a second refrigerant spray nozzle 15, or plurality of such nozzles, in the evaporator 5. In this manner, a continuous flow of liquid refrigerant is in heat exchange contact with heat exchange tubing 27 in the evaporator 5. A fluid medium, such as water, passes into the heat exchange tubing 27 in the evaporator 5 through an inlet line 13 and is chilled by giving up heat to evaporate refrigerant within the evaporator 5. The chilled medium passes out of the heat exchange tubing 27 through an outlet line 14 to suitable remote heat exchangers (not shown) and is returned to the evaporator 5 through the inlet line 13 for rechilling.

The refrigerant vapor from the evaporator 5 passes through refrigerant vapor passage 18 to the absorber 2. The strong solution inlet passage 19 admits strong solution from the solution heat exchanger 7 into the absorber 2. The strong solution flows through the absorber 2 and is brought into contact with refrigerant vapor from the evaporator 5 to form weak solution which collects in sump 28 of the absorber 2. A cooling medium, such as cool water, is passed through tubing in the absorber 2, or other suitable means are used, to cool the solution in the absorber 2, to promote the absorption of refrigerant vapor therein.

A weak solution discharge passage 20 from the absorber 2 provides an inlet to the solution pump 10 which pumps weak solution from the absorber 2 through a weak solution discharge line 26 to a heat exchange coil 22 in the solution heat exchanger 7 which is in heat exchange relationship with strong solution flowing through the solution heat exchanger 7 to the strong solution inlet passage 19. The relatively cool, weak solution flowing through the coil 22 is heated by the relatively hot, strong solution flowing through the solution heat exchanger 7 which is cooled thereby. The weak solution from the heat exchange coil 22 in the solution heat exchanger 7 is conducted through weak solution heat exchanger discharge line 23 to the heat exchange coil 24 in the triple loop heat exchanger 6. Then, the weak solution passes from the heat exchange coil 24 to generator inlet line 29 which leads to the generator 3.

Also, as shown in the FIGURE, a bypass system 8 includes a heat exchange coil 40 in the triple loop heat exchanger 6, an inlet line section 41 for admitting strong solution from the generator 3 to the heat exchange coil 40, a trap section 42 and an outlet line section 43. The bypass system 8 passes excess strong solution from the generator 3 through the triple loop heat exchanger 6 and around the solution heat exchanger 7 to the absorber 2 when strong solution builds up in the generator 3 to an undesirable level due to solidification of strong solution in the triple loop heat exchanger 6 or in the solution heat exchanger 7 or due to other such blockage.

The trap 42 of the bypass system 8 normally has a quantity of liquid contained therein to provide a liquid-vapor barrier which maintains a normal pressure difference existing between the generator 3 and the absorber 2 during normal operation of the absorption refrigeration system 1. The trap 42 is necessary so that this normal pressure difference between the generator 3 and the absorber 2 will be maintained during the operation of the absorption refrigeration system 1. The vertical extent of the trap portion 42 below the absorber 2 is determined, in part, by the amount of liquid required to maintain this normal pressure difference between the generator 3 and the absorber 2. As shown in the FIGURE, the trap 42 is below the level of the absorber 2 and terminates in the upwardly extending outlet line 43 which connects the bypass system 8 to the absorber 2.

If desired, suitable signal means (not shown) may be provided to indicate to an operator when solution is flowing through the bypass system 8 so that the operator may take action to remedy this situation by removing any blockage or by taking other appropriate action. Alternatively, an automatic control system may be actuated to unblock the triple loop heat exchanger 6 and/or the solution heat exchanger 7, or to take other suitable steps. However, under typical operating conditions, when the bypass system 8 is operating, any blockage due to solidified strong solution will be removed due to relatively hot, strong solution flowing through the heat exchange coil 40 in the triple loop heat exchanger 6 and due to relatively warm, weak solution which is pumped from the absorber 2 through the heat exchange coil 22 in the solution heat exchanger 7 and then through the heat exchange coil 24 in the triple loop heat exchanger 6 back to the generator 3.

Referring to the FIGURE, it may be seen that the triple loop heat exchanger 6 comprises a shell or elongated box 50 which encloses the heat exchange coil 24 through which weak solution is pumped from the solution heat exchanger 7 to the generator 3. The shell or elongated box 50 also encloses the heat exchange coil 40 of the bypass system 8. The shell or elongated box 50 is simply an enlarged portion of a strong solution line, which includes strong solution discharge lines 17 and 25, for conducting strong solution from the generator 3 to the solution heat exchanger 7. By enclosing the heat exchange coils 24 and 40 within the shell or elongated box 50, strong solution flowing through the strong solution line from the generator 3 to the solution heat exchanger 7 is in heat exchange relationship with solution flowing through the heat exchange coils 24 and 40.

Of course, the foregoing is only one possible structure for the triple loop heat exchanger 6 and one of ordinary skill in the art to which the present invention pertains will readily perceive many other structures for the triple loop heat exchanger 6. For example, the triple loop heat exchanger 6 may comprise three conduits welded together in heat exchange relationship or may comprise a tube-in-tube type structure.

Also, it should be noted that, as shown in the FIGURE, the triple loop heat exchanger 6 leaves certain lengths of conduits, such as lines 17, 29, and 41, and lines 23, 25, and 42 exposed to ambient conditions. However, preferably, to maximize the effectiveness of the triple loop heat exchanger 6, as much of these lines as possible should be included as part of the triple loop heat exchanger 6. Of course, the amount of these lines which is practical to include in a given triple loop heat exchanger 6 will depend on the geometry and space limitations of the particular absorption refrigeration system 1 with which the triple loop heat exchanger 6 is used.

During normal operation of the absorption refrigeration system 1, strong solution flows from the sump 30 of the generator 3 through the strong solution discharge line 17 to the triple loop heat exchanger 6. Strong solution builds up in the sump 30 of the generator 3 to a normal operating level below the top of the inlet line section 41 of the bypass system 8 so that strong solution does not enter the bypass system 8 during normal operation of the absorption refrigeration system 1. As the relatively hot, strong solution from the generator 3 flows through the triple loop heat exchanger 6 to the discharge line 25 it is cooled by relatively cool, weak solution flowing through the heat exchange coil 24 in the triple loop heat exchanger 6. This relatively cool, weak solution enters the heat exchange coil 24 via weak solution heat exchanger discharge line 23 from the solution heat exchanger 7 and exits the heat exchange coil 24 via the generator inlet line 29 leading to the generator 3. Thus, during normal operation of the absorption refrigeration system 1, the strong solution flowing from the generator 3 to the absorber 2 is precooled in the triple loop heat exchanger 6 by weak solution which is being pumped back from the absorber 2 to the generator 3 and this weak solution is thereby preheated in the triple loop heat exchanger 6. This preheating of weak solution and precooling of strong solution is in addition to the similar preheating and precooling done in the solution heat exchanger 7. In this manner, the triple loop heat exchanger 6 increases the surface area over which heat exchange occurs between the relatively hot, strong solution flowing from the generator 3 to the absorber 2 and the relatively cool, weak solution which is pumped from the absorber 2 back to the generator 3. This provides an overall operating efficiency improvement for the absorption refrigeration system 1.

As noted above, during normal operation of the absorption refrigeration system 1, no solution passes through the bypass system 8. However, if strong solution in the triple loop heat exchanger 6 or in the solution heat exchanger 7 is cooled below its solidification point, the normal passage for return of strong solution from the generator 3 to the absorber 2, through the triple loop heat exchanger 6 and then through the solution heat exchanger 7, will be blocked off and the level of strong solution in the generator 3 will overflow the top of the inlet line section 41 of the bypass system 8. This allows strong solution to flow from the generator 3 through the bypass system 8 to the sump 28 of the absorber 2. In this manner, the absorption refrigeration system 1 will be maintained in a mode of operation which allows partial operation and which prevents damage to the system 1.

When the bypass system 8 is operating, the flow of relatively hot, strong solution through the heat exchange coil 40 in the triple loop heat exchanger 6 will warm any soldified strong solution in the triple loop heat exchanger 6 thereby aiding in desolidifying any strong solution which may have solidified in the triple loop heat exchanger 6. Also, the flow of relatively hot, strong solution through the bypass system 8 to the sump 28 of the absorber 2 will warm the weak solution which is being pumped by solution pump 10 back to the generator 3 through the solution heat exchanger 7 and the triple loop heat exchanger 6. This relatively warm, weak solution flowing through the triple loop heat exchanger 6 and the solution heat exchanger 7 may sufficiently warm any solidified strong solution in these heat exchangers 6, 7 to desolidify any such solidified strong solution thereby returning the refrigeration system 1 to normal operation. In addition, if a signal means is provided to warn an operator, the alerted operator may take appropriate action to return the absorption refrigeration system 1 to normal operation. Alternatively, if desired, an automatic control system may be acticvated to take appropriate action as described above.

Of course, the foregoing description is directed to a preferred embodiment of the present invention and various modifications and other embodiments of the present invention will be readily apparent to one of ordinary skill in the art to which the present invention pertains. Therefore, while the present invention has been described in conjunction with a particular embodiment it is to be understood that various modifications and other embodiments of the present invention may be made without departing from the scope of the invention as described herein and as claimed in the appended claims.

What is claimed is:

1. A triple loop heat exchanger for an absorption refrigeration system having a generator, an absorber, a solution heat exchanger, and a bypass system, said triple loop heat exchanger comprising:
   means for conducting weak solution from the solution heat exchanger to the generator;
   a strong solution line for conducting strong solution from the generator to the solution heat exchanger, at least a portion of said strong solution line in heat exchange relationship with the means for conducting weak solution from the solution heat exchanger to the generator; and
   a bypass system for conducting strong solution from the generator around the strong solution line and around the solution heat exchanger to the absorber when strong solution builds up in the generator above a selected level, at least a portion of said bypass system in heat exchange relationship with the strong solution line for conducting strong solution from the generator to the solution heat exchanger.

2. A triple loop heat exchanger for an absorption refrigeration system as recited in claim 1 wherein said means for conducting weak solution from the solution heat exchanger to the generator comprises:
   a heat exchange coil enclosed in at least a portion of the strong solution line whereby strong solution flowing through the strong solution line is in heat exchange contact with said coil.

3. A triple loop heat exchanger for an absorption refrigeration system as recited in claim 1 wherein said bypass system comprises:
   a bypass system heat exchange coil enclosed in at least a portion of the strong solution line whereby strong solution flowing through the strong solution line is in heat exchange contact with said bypass system heat exchange coil.

* * * * *